US008483963B2

(12) United States Patent
Kline (10) Patent No.: US 8,483,963 B2
(45) Date of Patent: Jul. 9, 2013

(54) METHOD OF EVALUATING WIND FLOW BASED ON TERRAIN EXPOSURE AND ELEVATION

(76) Inventor: John Bertrand Kline, Brentwood, CA (US)

(*) Notice: Subject to any disclaimer, the term of this patent is extended or adjusted under 35 U.S.C. 154(b) by 230 days.

(21) Appl. No.: 12/807,812

(22) Filed: Sep. 13, 2010

(65) Prior Publication Data

US 2012/0065886 A1   Mar. 15, 2012

(51) Int. Cl.
*G01W 1/00* (2006.01)

(52) U.S. Cl.
USPC .......... 702/3; 702/2; 702/5; 702/12; 702/142; 702/50

(58) Field of Classification Search
USPC ................. 702/3, 2, 5, 12, 142, 50
See application file for complete search history.

(56) References Cited

U.S. PATENT DOCUMENTS

2004/0054476 A1* 3/2004 Ohba et al. .......... 702/3
2006/0173623 A1* 8/2006 Grzych et al. ......... 702/3

FOREIGN PATENT DOCUMENTS

JP   11093824 A   *   4/1999

OTHER PUBLICATIONS

Jack Kline, "A new and Objective Empirical Model of Wind Flow Over Terrain," AWEA Wind Resource & Project Assessment Workshop, (2007).*
John Bosche, "Wind Flow Modeling Software Comparison," AWEA Wind Resource Assessment Workshop (Sep. 2009).*
Jack Kline, Recent experience with the NOABL model in highly complex terrain (1993).*

* cited by examiner

*Primary Examiner* — Jonathan C Teixeira Moffat
*Assistant Examiner* — Hyun Park
(74) *Attorney, Agent, or Firm* — John Bosche (57) ABSTRACT

A method of modeling the spatial variation in wind resource at a prospective wind farm site. The method involves calculating terrain exposure at multiple locations of interest, such as the locations of meteorological towers and prospective wind turbine locations. Measured average wind speeds from the meteorological tower locations are empirically correlated with terrain exposure to create a model wherein annual average wind speed can be calculated for any location on the site as a function of terrain exposure. The method can use upwind terrain exposure, downwind terrain exposure, or both. It can also be used together with terrain elevation to create a robust three parameter model. The method requires wind measurements from at least two meteorological towers, with improved performance when measurements are available from a larger number of meteorological towers.

12 Claims, 6 Drawing Sheets

METHOD OF EVALUATING WIND FLOW BASED ON TERRAIN EXPOSURE AND ELEVATION

FIELD OF THE INVENTION

The invention relates to a wind flow model for predicting the spatial variation in wind resource at a prospective wind farm site. Specifically the invention relates to the design of an empirical wind flow model that uses wind data measured at two or more meteorological towers and evaluates the variation in mean wind speed in the context of physical parameters that describe the individual meteorological tower sites, including terrain exposure and/or elevation.

BACKGROUND OF THE INVENTION

One of the most important aspects of evaluating a prospective wind farm is defining the wind resource for each wind turbine location that is proposed in an array of turbines that are distributed spatially across the wind farm site. Typically this is done by making measurements of the wind speed and direction at some number of locations within the project boundaries with towers or masts instrumented with anemometers and wind vanes, called a meteorological (met) tower. In some cases, there may be only one meteorological tower and in others, there may be several. Typically, more than one met tower is used to assess the wind resource of a potential commercial utility-scale wind farm. In some cases, sites may have as many as a dozen or more met towers. For sites with more than one met tower, it is common that one met tower is considered as a reference tower. The reference tower is typically the tower with the longest and most reliable wind speed and direction measurements. Wind speed and direction at other tower sites are correlated to measurements at the reference tower and are normalized to produce a consistent set of annual average wind speeds at relevant heights, usually the hub height of the proposed wind turbine or the upper measurement height of each meteorological tower. A joint frequency distribution of measured wind speed and wind direction, normalized for an average year, is used to define the wind climatology for a met tower location. Accurate measurement of wind speed and direction and calculation of wind climatology are known to one of ordinary skill in the art and further details are not provided here. Information about wind measurement and calculation of wind climatology can be found in *Wind Characteristics*, by Janardan Rohatgi and published by the Alternative Energy Institute, West Texas A&M University, 1994, incorporated herein by reference.

Typically, analysis of data collection from several meteorological towers across a site show that the wind does not blow with the same average annual wind speed from location to location. Many wind farms are developed in areas, such as the Great Plains, where there are few trees or other significant "surface roughness elements" that are well known to affect wind flow over the surface. In such places where the surface roughness is rather uniform, the variation in mean wind speed is driven to a large degree by variations in terrain elevation, or what are commonly referred to as "terrain effects". Even where significant surface roughness elements exist, the spatial variation of annual average wind speed can often still be largely driven by terrain effects.

It has been observed that in areas where there are significant differences in terrain elevation across a wind farm site, the variance in mean wind speeds between met towers tends to be greater, indicating more extreme terrain effects. Conversely, areas with small differences in terrain elevation tend to have more subtle variations in wind speed, although spatial variation of annual average wind speed at these sites is still often significant and can have an important effect on predicted annual energy output for a wind farm at the proposed site.

Because it is not practical to measure the wind speed at each turbine site in a wind farm, it is necessary to extrapolate the observed wind speeds at the met tower sites to each turbine site and use this as a basis for calculating the energy output from the turbines that constitute the wind farm. Various wind flow models have been developed for this purpose and a number of such models are commercially available.

These models all use the wind speed and wind direction data measured at the met tower sites in conjunction with terrain elevation data, as in digital elevation models (DEM), to produce estimates of wind speeds at the proposed wind turbine locations. The models attempt to utilize variations in terrain elevation and surface roughness to calculate variations in wind speed and direction at specified turbine locations.

One of the most widely used models in the commercial wind energy industry is the Wind Atlas Analysis and Application Program (WAsP) developed by Risø DTU, Denmark. The WAsP model uses wind data from only one met tower at a time as input in order to estimate the wind speeds at the locations of each wind turbine site. This model makes calculations of the terrain elevations around the met tower location and the wind turbine locations and interprets the terrain calculations at the turbine sites with respect to the met tower to produce the wind speed estimates. The WAsP model is often referred to as a linear model and is reputed to be quite simple in its approach to the problem. Another similar model is MS-Micro/3, developed by Meteorological Service of Canada. Both of these models use similar physics in their calculations. Both have been found to result in large errors in prediction of annual average wind speed for some wind turbine locations, particularly at sites with complex terrain. Nevertheless, they continue to be utilized as the standard wind flow models in the wind energy industry. Newly developed wind flow models are often evaluated based on their ability to make more accurate predictions of spatial variation in wind climatology than WAsP.

Other, more complicated models are based on computational fluid dynamics (CFD), which solve fluid flow equations in consideration of the terrain, as represented by the DEM, in conjunction with the winds at the site, as represented by the meteorological tower data. Unlike WAsP and MS-Micro/3, many of these models can use wind information from more than one meteorological tower site at a time. Commercial CFD models include WindSim and Meteodyn.

Modeling the variation in wind climatology over a wind farm project site is one of the most challenging and difficult aspects of the wind resource assessment process. This challenge increases as terrain complexity increases. The differences in annual average wind speeds measured across a prospective wind farm site are in some cases baffling, defying a logical explanation, except to say that they are due to "terrain effects". Indeed, in the absence of significant changes in surface roughness, wind speed variations across a site are due to the changes in terrain—ridges, valleys, and undulations that clearly must affect the wind speeds, but understanding how is not always clear. Prior art wind flow models often result in large errors in predicted wind speeds, particularly at sites with complex terrain.

Tests of the accuracy of prior art models has proven that their accuracy is not very good, particularly in conditions where the terrain is complex and the variability of the wind speeds are high. This lack of accuracy is detrimental to producing accurate estimates of energy output from wind farms.

SUMMARY OF THE INVENTION

The disclosed invention is an empirical/objective wind flow model that uses the wind data measured at the proposed wind farm site and analyzes the wind speeds in the context of the physical parameters that describe the individual met tower sites. This innovation is concerned with the variation in wind speeds due to terrain effects and does not consider the effects of significant surface roughness variations.

In this model, the physical parameters are the met towers' terrain exposures and/or the met towers' elevations. The technique involves performing a least-squares regression, or other acceptable linear or non-linear regression, of the mean wind speeds at the met towers against the terrain parameters that describe the terrain at each tower. In many cases, the terrain exposure parameters can explain most of the differences in wind speeds between anemometer tower sites.

The wind flow model of the present invention has been tested recently and compared to modeling results from a number of commercially available models, including WAsP, MS-Micro/3, and CFD models such as WindSim and Meteodyn for a number of wind farm sites with varying degrees of terrain complexity. In these tests, at all but one of the test sites, the wind flow model of the present invention was found to be more accurate than the other models. These results were presented at the American Wind Energy Association Wind Resource Assessment Workshop in Minneapolis, Minn., at the end of September 2009.

BRIEF DESCRIPTION OF THE DRAWINGS

Features and advantages according to embodiments of the invention will be apparent from the following Detailed Description taken in conjunction with the accompanying drawings, in which.

DETAILED DESCRIPTION OF THE INVENTION

The invention disclosed herein entails a new model to predict the spatial variation of wind flow at a site with multiple meteorological towers. It is necessary to have measurements from at least two meteorological towers to utilize the method of the present invention, although the accuracy of the method is improved with additional towers, so it is preferred to have as many meteorological towers as economically practical.

The model calculates exposure values (representations of elevation differences between the point in question—i.e. a met tower site or prospective turbine site—and the surrounding terrain out to a user-specified radius) in 16×22.5° direction ranges. It is possible to use a different number of direction sectors with different widths (for example, 12 sectors of 30 degrees width or 20 sectors of 18 degrees width), but the preferred embodiment utilizes 16 direction sectors. This calculation of exposure for a given location is produced by a novel algorithm that is defined below.

Exposure is defined by a parameter that describes whether the elevation at a specific location is higher or lower than the terrain surrounding it. The exposure parameter is dimensional, and has the same units used to define terrain elevation, typically meters. If one is standing on the top of a hill or on the crest of a ridge, one can look about and observe that the location is higher in elevation than the surrounding terrain; this location would be called well exposed and would have a high (positive) exposure index based on the method of the present invention. Conversely, if one is in a ravine, one would say that the location has poor exposure, as most of the surrounding terrain is higher than the given location. The ravine location would have a low (and negative) exposure index based on the method of the present invention. Other locations can be mixed. In some directions the terrain may be lower than at the given location, so one would say that relative to the terrain in those directions that particular location has good (positive) exposure, but in other directions, where the surrounding terrain rises in elevation above that spot, the exposure is not as good (negative).

The calculation of exposure as produced in the model has two parts; the first is the calculation of the elevation at the site in question and the second is the actual calculation of the exposure based on the calculated elevation in relation to the surrounding terrain. Both these calculations are made using gridded digital elevation data. Most commonly, the data used for these calculations has 30-meter horizontal resolution (easting and northing) and elevations in meters at each grid point. While such calculations could be made at any grid resolution or units, at increasingly coarse horizontal resolutions the accuracy of the elevation calculations, and hence the exposure, is likely to suffer, particularly in complex terrain locations.

Figure 1:
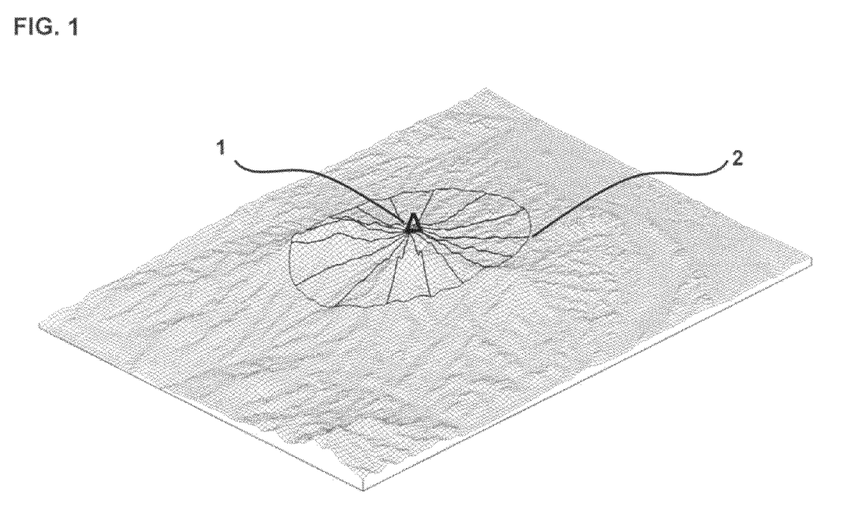
FIG. 1 shows a terrain and a meteorological tower at a prospective wind farm site.

An example wind farm site is shown in FIG. 1 and will be used herein as an example for utilization of the method of the present invention. The example site consists of a small grouping of hills surrounded by other minor terrain features. FIG. 1 shows one meteorological tower 1 represented by a Δ, with a sample radius and the 16 direction sectors from which to calculate the exposure of the site 2. The method can be applied to any wind farm site with wind speed measurements from two or more met towers.

Figure 2:
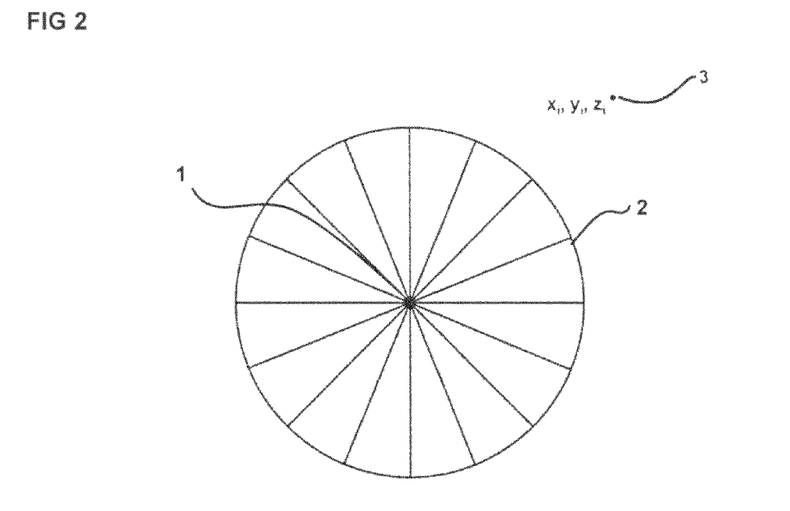
FIG. 2 shows a plan view of a grid of digitized terrain points, together with direction sectors to be evaluated for exposure.

The elevation across the site is defined by a grid of coordinates, as shown in FIG. 2, wherein each grid point 3 contains an easting (or longitude) value (denoted $X_i$), a northing (or latitude) value (denoted $Y_i$), and an elevation (denoted $Z_i$). Any terrain can be modeled using the method of the present invention as long as it can be defined by a grid of coordinates with easting, northing, and elevation. In practice, it is possible to obtain terrain coordinates from the United States Geological Survey (USGS) or comparable agencies in other countries. The terrain data that USGS provides is referred to as a Digital Elevation Model (DEM) and is defined by regularly spaced grid points that are commonly spaced every 10 meters or every 30 meters. It is possible to create a higher resolution DEM file using site-specific survey data based on stereophotogrammetry, synthetic apearture radar, LIDAR measurements or other survey techniques. By way of example, the method of the present invention is described herein with reference to 30-meter DEM data as obtained from USGS, but it is to be understood that the method can work equally well with other sources of terrain data and that one of ordinary skill in the art would be capable of obtaining and working with various sources of terrain data.

Figure 3:
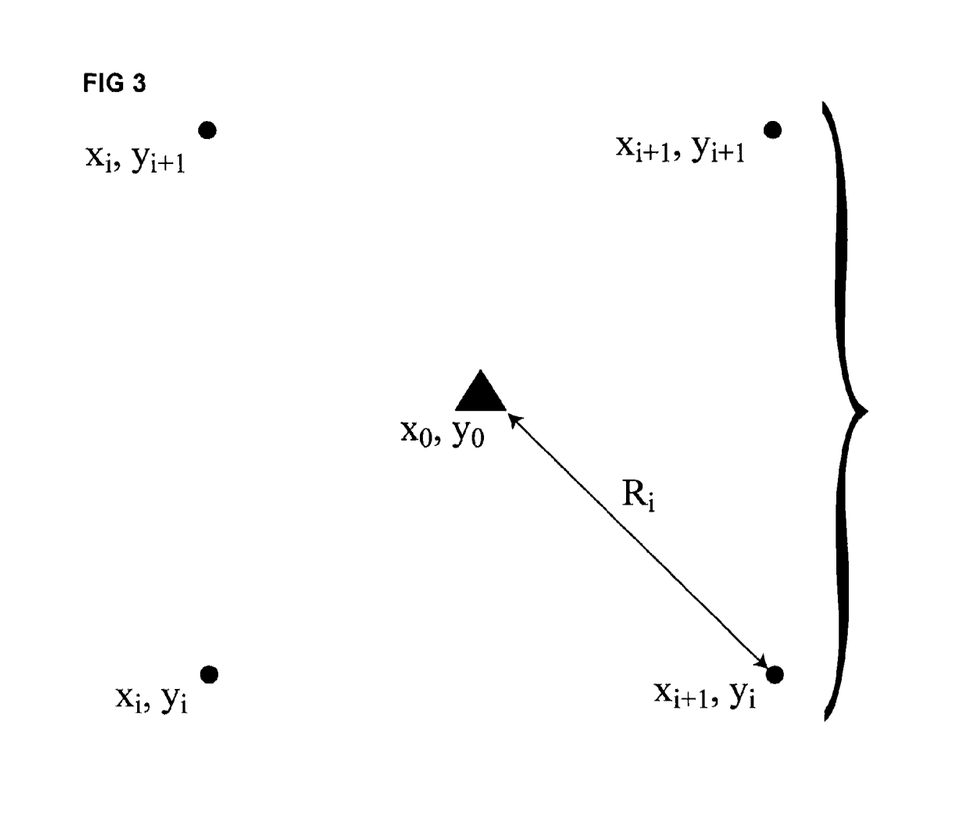
FIG. 3 shows a location to be evaluated together with four adjacent digitized terrain grid points.

FIG. 3 shows a location of interest at a wind farm (for example a met tower location or a proposed wind turbine location) together with adjacent DEM grid points. In this and subsequent discussion, the following variables will be used:

$X_i$=the $i^{th}$ easting coordinate in the DEM.
$Y_i$=the $i^{th}$ northing coordinate in the DEM.
$Z_i$=the $i^{th}$ elevation in the DEM.
$X_0$=the easting of the site in question.
$Y_0$=the northing of the site in question.
$Z_0$=the elevation of the site in question.
$R_i$=the distance from the site to the $i^{th}$ coordinate in the DEM.

The location of each met tower or wind turbine site is defined by a pair of coordinates, often in the Universal Transverse Mercator projection system (UTM). In this case, the coordinates are in meters distance of easting and northing with respect to some reference point.

If the coordinates of a met tower or wind turbine site are determined to be on one of the grid points in the DEM the data points are read until the coordinates of the site are located and the elevation at that pair of coordinates is taken as the elevation of the site. If the coordinates of the site do not correspond with one of the DEM grid points, then the elevation of the site must be calculated. There are a number of methods for determining the elevation of the site, including cubic spline fitting of terrain, linear interpolation of surrounding DEM data points, rubber sheeting, or other methods that would be familiar to one of ordinary skill in the art. By way of example, one method for determining the elevation of a non-coincident site is presented below, although it is to be understood that other methods for interpolating elevation points can be utilized within the scope of the present invention.

If the coordinates of the site are determined to have the same easting as is found for some of the grid points in the DEM but not coincident with any northing coordinate, then the elevation is calculated thusly: The DEM data are read until the two data points (X, Y, Z) on each side of the site's northing coordinate are located. The distance from the site to each of the two coordinate points is calculated as:

$$R_1=((X_0-X_1)^2+(Y_0-Y_1)^2)^{1/2}$$

$$R_2=((X_0-X_2)^2+(Y_0-Y_2)^2)^{1/2}$$

The elevation at the site is then calculated as the inverse-square-of-distance weighted mean elevation:

$$Z_0 = \sum_{i=1}^{2}(Z_i*1/R_i^2) \bigg/ \sum_{i=1}^{2}1/R_i^2$$

Similarly, if the coordinates of the site are determined to have the same northing as is found for some of the grid points in the DEM but not coincident with any easting coordinate then the elevation is calculated the same as above, but using the elevations at the grid points on either side of the site's easting.

However, by far the most frequent situation is when the site's coordinates are not the same as any northing or easting in the DEM and instead lie within four grid points, in which case the elevation is calculated by a similar method. The DEM data are read until the four data points (X, Y, Z) surrounding the site's northing and easting coordinates are located. The distance from the site to each of the four coordinate points (i=1 to 4) is calculated as:

$$R_1=((X_0-X_i)^2+(Y_0-Y_1)^2)^{1/2}$$

The elevation at the site is then calculated as the inverse-square-of-distance weighted mean elevation:

$$Z_0 = \sum_{i=1}^{4}(Z_i*1/R_i^2) \bigg/ \sum_{i=1}^{4}1/R_i^2$$

This procedure is repeated for all sites (met tower or turbine) for which terrain exposures are to be calculated. The above method for determining the elevation of a site of interest is presented as one example of interpolating DEM grid points, but any other method that accurately estimates the elevation of a site of interest can be used within the scope of the present invention.

Once the elevation at each site has been calculated, an exposure index for each direction sector is calculated.

The calculation of exposure indices can be performed using any suitable software or calculation tool by implementing the equations and algorithms described herein. For example, the calculations could be performed in a Microsoft Excel spreadsheet, they could be implemented in custom computer code written in Fortran, C, Visual Basic, or any other suitable code, or they could be calculated using Geographical Information System (GIS) software such as ArcGIS.

In the actual running of the computer program that calculates the terrain exposure, there are user selected values for several important parameters that are optionally entered at runtime. For example, the user must select the distance or maximum radius for which the exposure index calculations are to be made, as well as an exponent for the inverse-distance-weighting of the elevation differences. Based on testing and experimentation to date, the best results have been obtained with a radius of 3500 meters and an exponent value of 1, but this is not always the case and having this additional flexibility is maintained in the model. The best values for radius and exponent are likely site-specific and can be selected by one of ordinary skill in the art through experimentation using the method described below.

The following variables are defined for the exposure calculation:

$E_j$=the weighted mean exposure index in the $j^{th}$ direction sector.
D=the maximum distance or radius from the site that will contribute to the exposure values.
θ=the azimuth from the site to a grid point.
W=the exponent applied for inverse-distance-weighting of the elevation difference between the site and a grid point.

The exposure at a site is determined by the following steps:
Step 1: The grid points $(X_i, Y_i, Z_i)$ in the DEM are read in one at a time.

First, the distance, $R_i$, from the site of interest to each grid point is calculated.

$$R_i = ((X_0 - X_i)^2 + (Y_0 - Y_i)^2)^{1/2}$$

If the distance is less than or equal to D then the calculation proceeds to the next step:

Step 2: Calculate the azimuth, θ, from the site to the grid point. The azimuth angle can be calculated using any suitable method that would be familiar to one of ordinary skill in the art. By way of example, one possible calculation method is presented herein.

In calculating the azimuth from the site location $(X_0, Y_0)$ to the grid point location $(X_i, Y_i)$ the differences between the easting and northing are calculated:

$$Xdif = (X_i - X_0)$$

$$Ydif = (Y_i - Y_0)$$

Based on the relative distance in easting and northing the azimuth is calculated for two special cases thus:
1) If Xdif=0 then the grid point is either due north or due south of the site. In which case if Ydif>0 then θ=360° and if Ydif<0 then θ=180°.
2) If Ydif=0 then the grid point is either due east or due west of the site. In which case if Xdif>0 then θ=90° and if Xdif<0 then θ=270°.

If neither of these two cases is true then the azimuth is calculated thus:

If $Xdif > 0$ then $\theta = 90° - ((180°/\pi) * \tan^{-1}(Ydif/Xdif))$ or

If $Xdif < 0$ then $\theta = 270° - ((180°/\pi) * \tan^{-1}(Ydif/Xdif))$ where $\tan^{-1}(Ydif/Xdif)$ is expressed in radians.

The direction sectors, 1 through 16, begin with north, centered on due north.
1) Sector 1: 349.75°<=azimuth and azimuth<11.25°.
2) Sector 2: 11.25°<=azimuth<33.75°
  . . .
  . . .
  16) Sector 16: 327.25°<=azimuth<349.75°

For a different number of direction sectors, the angles defining the edges of each sector would be different, but the method does not change based on the number of direction sectors.

Step 3: Having determined that the grid point is within the limit of distance that was selected and the sector to which it applies, the elevation difference between the site and grid point elevation is calculated:

$$Zdif_i = (Z_0 - Z_i)$$

The elevation differences are weighted and accumulated in variables, such that the exposure in each sector is defined by $$E_j = \frac{\sum_{i=1}^{n} (Zdif_i * R_i^{-W})}{\sum_{i=1}^{n} R_i^{-W}}$$

where n represents the total number of grid points determined to be within the $j^{th}$ direction range and within the maximum distance for which the calculation is being made.

Step 4: The weighted exposures in the 16 sectors are calculated and then used as a basis to try to describe the variance in wind speeds due to terrain effects. Differences in wind speeds between two sites as a function of wind direction are in many cases directly dependent upon the corresponding difference in terrain exposure.

Two examples of the application of the terrain exposure calculations follow. The two examples are referred to herein as a "sector-wise" model and a "bulk" model.

"Sector-Wise" Model:

Consider two 60-meter meteorological tower locations, called Site 1 and Site 2, on a hypothetical prospective wind farm project site where there are no significant surface roughness elements, but rather uniform low vegetation such as grassland or sagebrush. The terrain at this hypothetical project site is not particularly complex. In this example, consider that Site 1 is located on what one might consider a mild ridge, and that Site 2 is on flatter terrain to the north. A comparison of the concurrent mean wind speeds reveals that the second site on the flatter terrain has higher wind speeds than the one on the mild ridge. The 60-meter mean wind speed ratio of Site 1 to Site 2 is 0.95.

Figure 4:
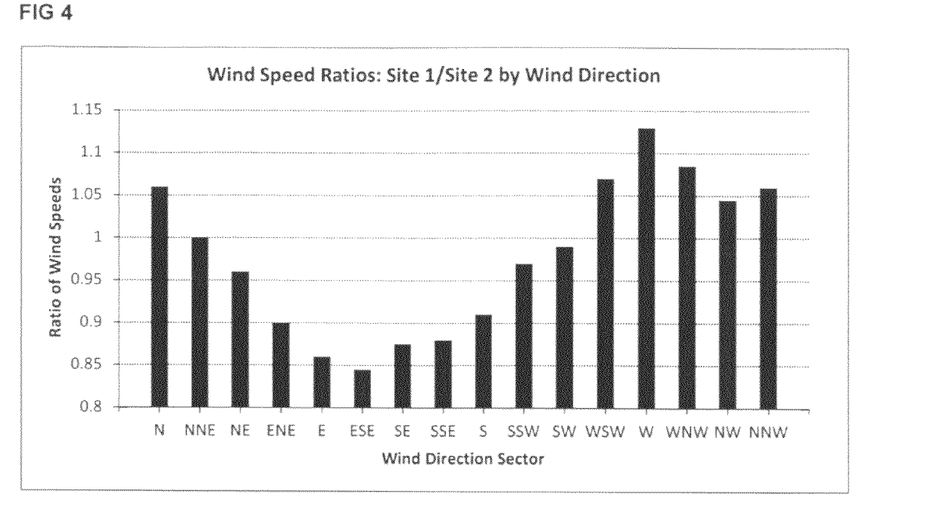
FIG. 4 shows a graphical depiction of wind speed ratios for various wind directions for two meteorological tower sites.

First, the wind speed data at the two meteorological tower sites are analyzed to produce wind speed ratios of Site 1/Site 2 in 16×22.5° wind direction sectors, beginning with sector 1 centered on due north. The result is shown in FIG. 4. It is noted that the wind speed ratios shown in FIG. 4 are not necessarily related to meteorological tower sites on the prospective wind farm site shown in FIG. 1, and that both the terrain shown in FIG. 1, the wind speed ratios shown in FIG. 4, and further data examples provided herein are exemplary only and are not intended to represent any specific prospective wind farm location.

It is observed that in directions from west-southwest through north the wind speed at Site 1 is greater than at Site 2, but that for northeast through southwest wind directions Site 1 has lower wind speeds than Site 2. Presumably, the differences in wind speeds between the two sites are related to topographic differences.

Figure 5:
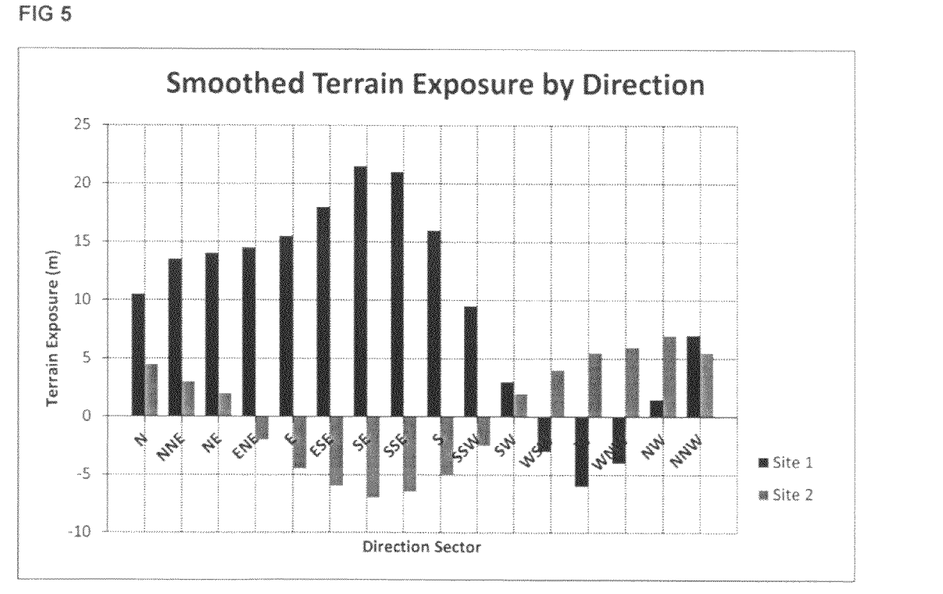
FIG. 5 shows terrain exposure by direction for the two meteorological tower sites depicted in FIG. 4.

FIG. 5 shows the calculated terrain exposure values at the two met tower sites by wind direction sector. The values have been smoothed over five sectors. It is observed that in general, Site 1 has much higher exposure values toward the southerly directions (it sits on a mild ridge with lower terrain to the south) than Site 2, and that in those directions where Site 1 has the high exposure values, Site 2 has negative exposure values (generally higher terrain to the south). In west-southwest through northwest wind directions, Site 2 has higher exposure values than Site 1.

Figure 6:
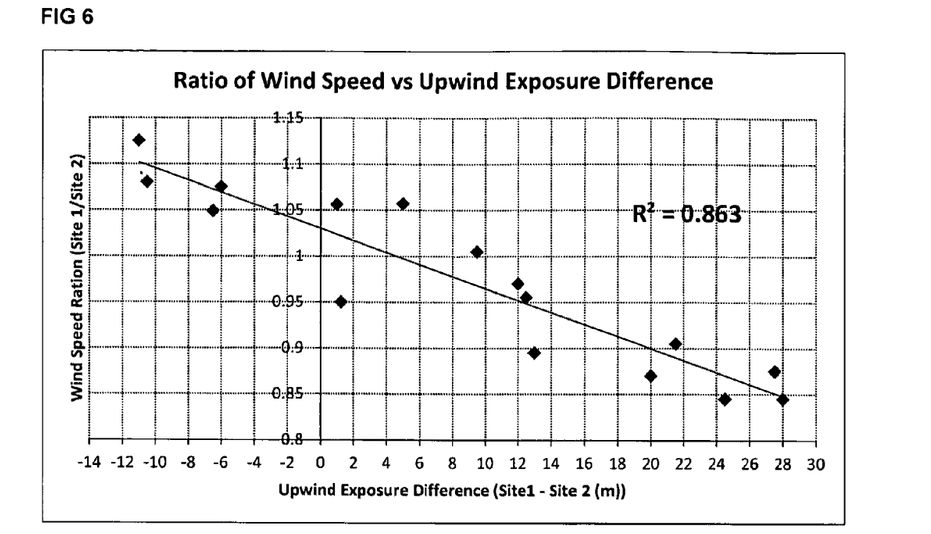
FIG. 6 shows the relationship between wind speed ratio and upwind exposure difference for each direction sector for the two meteorological tower sites depicted in FIG. 4.

On a sector-wise basis, the arithmetic difference between the exposure at Site 1 and Site 2 (Site 1–Site 2) is taken and the wind speed ratios (Site 1/Site 2, as in FIG. 4) are plotted versus upwind exposure differences and presented in FIG. 6. The upwind exposure for each sector is defined as the weighted exposure for the direction sector that corresponds to the direction sector from which the wind is blowing. For example, the exposure for sector 11 would be the upwind exposure for wind blowing from sector 11.

An important concept in the application of this model is to consider the exposure characteristics in both the upwind and downwind directions. In contrast to the upwind exposure described above, a downwind exposure can be defined that is the exposure for the direction sector that is offset by 180 degrees from the direction from which the wind is blowing. For example, the terrain exposure for sector 3 (in an example that uses 16 direction sectors) would be the downwind exposure for wind blowing from sector 11.

In FIG. 6, the wind speed ratios by sector are plotted versus the terrain exposure differences in the same sector, or the upwind exposure difference. A line has been fitted by regression through the data points to illustrate the trend in wind speed ratio versus upwind exposure difference. The slope and offset of the regression line are instructive to understanding the wind flow characteristics at the site being analyzed. The fitted line could be developed using any regression technique such as least squares or other suitable regressions.

Based on the exposure values presented in FIG. 5, it is easy to tell that in wind directions from north-northwest through southwest (in a clockwise sense), the exposure difference Site 1–Site 2 will have a positive result and that the exposure difference will have a negative result for the other directions.

The wind directions in which Site 1 has higher upwind exposure than Site 2 are associated with lower wind speed ratios (Site 1 wind speed <Site 2 wind speed). Directions in which Site 1 has lower exposure than site 2 are associated with higher wind speed ratios (Site 1 wind speed >Site 2 wind speed). Plotting the same ratios vs. the difference in downwind exposure one observes the opposite, as shown in FIG. 7.

Figure 7:
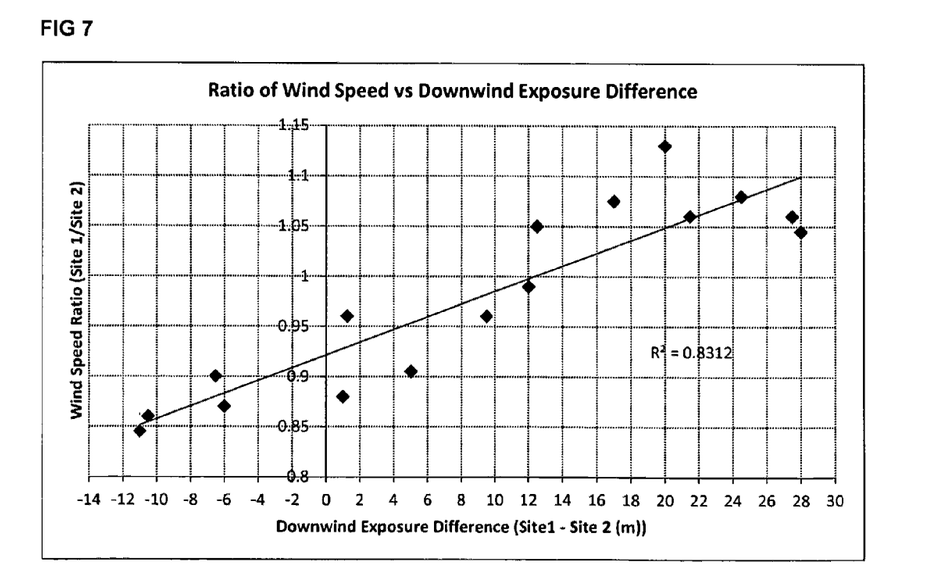
FIG. 7 shows the relationship between wind speed ratio and downwind exposure difference for each direction sector for the two meteorological tower sites depicted in FIG. 4.

In FIG. 7, the wind speed ratios in the northerly direction are plotted versus the smoothed exposure difference in the south sector and so on around the compass. It is observed that having higher exposure at Site 1 than Site 2 in the downwind direction tends to produce higher wind speed ratios. Plotting the wind speed ratios versus downwind exposure difference shows a positive slope to the relationship, whereas the relationship between the wind speed ratios and upwind exposure had a negative slope. This result is shown as an example, and is unique to the hypothetical prospective wind farm site that is analyzed herein by way of example. The slopes of wind speed ratios versus upwind and downwind exposure differences can vary from location to location based on topographic and meteorological conditions.

It is noted that, in the example shown, the intercepts of these graphs are not at a ratio of 1.0, which indicates that there are other factors at play that affect the strength of the wind speeds at these two sites. However, there is no denying that the difference in terrain exposure is effective in explaining why the wind speeds are higher at Site 2 than Site 1; Site 2 has better exposure characteristics in the downwind direction than Site 1.

Figure 8:
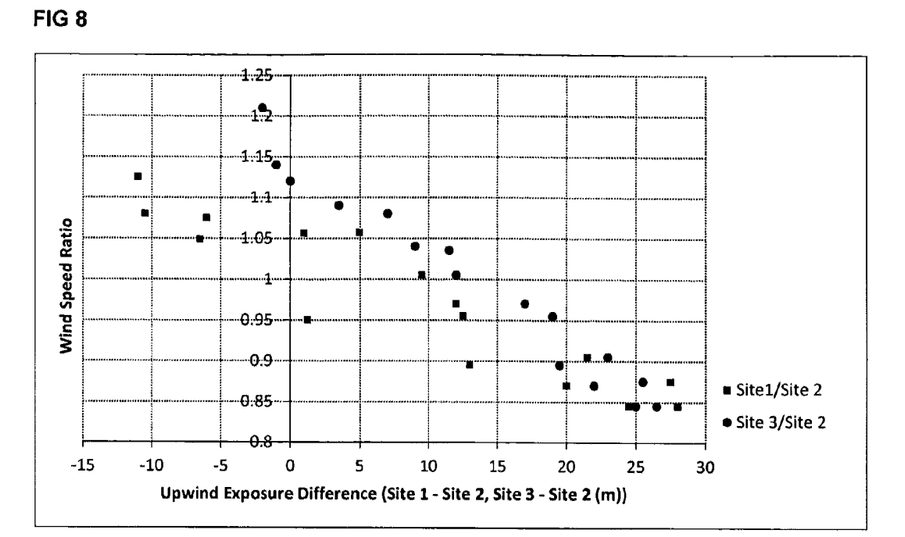
FIG. 8 shows the relationships between wind speed ratio and upwind exposure difference for each direction sector for three different meteorological tower sites.
Figure 9:
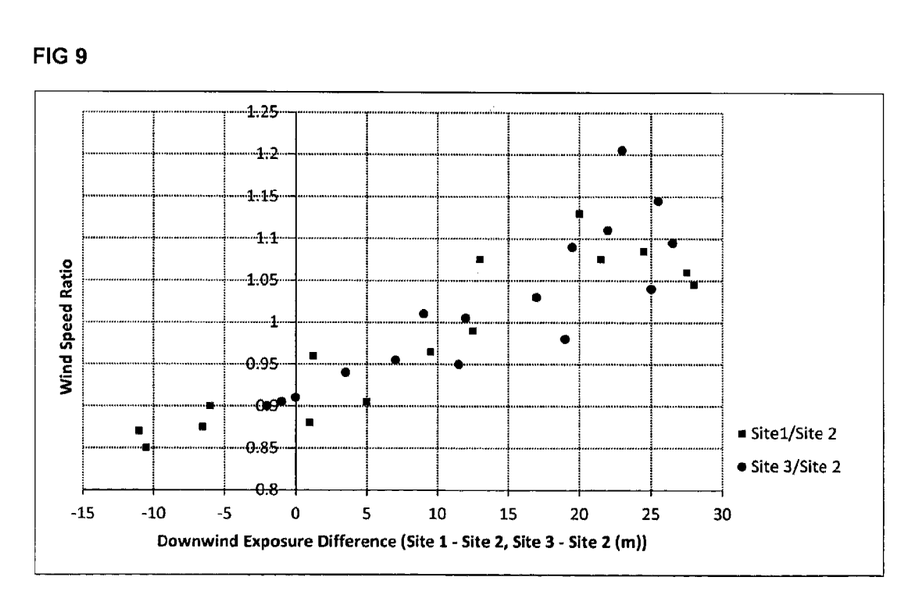
FIG. 9 shows the relationships between wind speed ratio and downwind exposure difference for each direction sector for three different meteorological tower sites.

In fact, the same kind of analysis was performed for a third meteorological tower site on the same hypothetical project site. This third site has the highest wind speeds of the three, yet the behavior of the wind speed at Site 3 with respect to the wind speeds at Site 2 in terms of the differences in terrain exposure is very similar to how the winds as Site 1 compare to Site 2. This is shown in FIGS. 8 and 9 which show the sector wise wind speed ratios vs. differences in terrain exposure at Site 3 with respect to Site 2, including the previous analysis at Site 1 with respect to Site 2. FIG. 8 shows the relationships for Sites 1, 2, and 3 for upwind exposure whereas FIG. 9 shows the relationships for downwind exposure. The wind speed ratios vs. exposure differences show a high degree of consistency for Site 1/Site 2 and for Site 3/Site 2, which indicates that exposure is a good predictor of wind speed variation at this prospective wind farm location.

The same kind of relationship between sector wise wind speed ratios and exposure differences has been observed at many project sites in a variety of topographic and meteorological conditions. It is in no way unique that improved wind speeds are associated with higher downwind exposure at this hypothetical prospective wind farm site. This trend is observed at most sites, although perhaps not so clearly as in these examples.

It is observed that sites with low exposure values do not always show the same kinds of patterns as well, which is believed to be related to the fact that in simple terrain (low values of exposure) the terrain influence is weakened relative to other factors related to surface roughness and meteorological effects. Also, it is important to have high levels of accuracy in the wind data, both wind speed and direction, since errors in either or any of these can make the relationships unclear.

The relationships observed in such analyses can be used to develop models that can be used to estimate wind speeds at turbine sites on the prospective wind farm project site. The procedure involves calculating a line of regression for the wind speed ratios vs. exposure differences, upwind or downwind, or a planar regression where both the differences in upwind and downwind exposure are used as independent variables. Then, a turbine site's exposure values are calculated and the difference between them and the reference met tower exposure values are calculated for each direction sector. The calculated regression between wind speed ratios versus exposure differences is then applied to the calculated exposure difference for each direction sector in order to calculate wind speed ratios for each direction sector with respect to a reference meteorological tower location. The wind speed ratios can be applied to the average wind speed for each directional sector at the reference meteorological tower in order to calculate the turbine site's wind speed for given direction sector. The average wind speed for each direction sector at the turbine site can be averaged with a weighting for the percentage of time that the wind blows from each respective direction sector. Typically, the resulting average wind speeds at the turbine sites are normalized by a similar calculation of the wind speed at meteorological tower where the wind speed is known. This serves to reduce bias and/or errors in the wind speed estimates. Depending on what types of models are used, the results from each can be combined in a weighted average, with weighting for each calculation provided by the coefficient of variance ($R^2$) of each regression analysis. In this way, an annual average wind speed can be calculated for each wind turbine site at the prospective wind farm location. This technique can also be used to estimate wind speed ratios in specific direction sectors.

By examining the relationship between wind speed ratios and exposure differences for both upwind and downwind exposure, it is possible to determine the parameter that best explains variations in wind speed at a particular prospective wind farm site. In some cases, upwind exposure may be most useful and in other cases, downwind exposure might be most useful, or using both in a planar regression may be most useful. By examining the amount of scatter and the statistical characteristics of these three regressions it is possible for one of ordinary skill in the art to select the best parameter(s) to use for predicting the wind speed at each wind turbine location.

In practice, there are two parameters that the user of the method of the present invention must select. These include the radius of terrain to be included in calculations of exposure index and the exponent, W, which is the exponent applied for inverse-distance-weighting of the elevation difference between the site and a grid point. These are best selected by trail and error. One of ordinary skill in the art would be able to select the best values of radius and the exponent W by using a variety of values for each parameter and looking for the combination of values that provide the best relationship between wind speed ratio and exposure difference, thereby presumably resulting in the most accurate predictions of wind speed at each wind turbine location.

"Bulk" Model:

Another way to use the terrain exposures to model wind speeds at a site is in what is termed the "bulk" model. In this application, which is well suited for sites with at least three, and preferably four or more meteorological towers, the 16 sector-wise exposure values at each tower are averaged with weighting provided by the wind direction frequency at the site. By way of example, if the exposure for a particular meteorological tower site is 11 meters for direction sector 1, and the wind blows from sector 1 for 10% of the time, the weighted exposure for that sector would be 1.1 meters. If the exposure at that same site for direction sector 2 is 14 meters and the wind blows from that direction sector 5% of the time, the weighted exposure for that sector would be 0.7 meters. One could continue this process for each direction sector and the sum the weighted exposures for each sector to obtain an overall bulk exposure for the meteorological tower location.

Weighted averages are calculated for both the mean upwind exposure and mean downwind exposure. The mean upwind exposure calculation weights the 16 exposure values by the corresponding frequency of occurrence of the wind direction (north exposure weighted by north wind direction frequency, east-northeast exposure weighted by east-northeast frequency, etc) and the mean downwind exposure weights the 16 exposure values by the frequency in the downwind direction (north exposure weighted by south wind direction frequency, north-northeast exposure weighted by the south-southwest direction frequency, etc).

Figure 10:
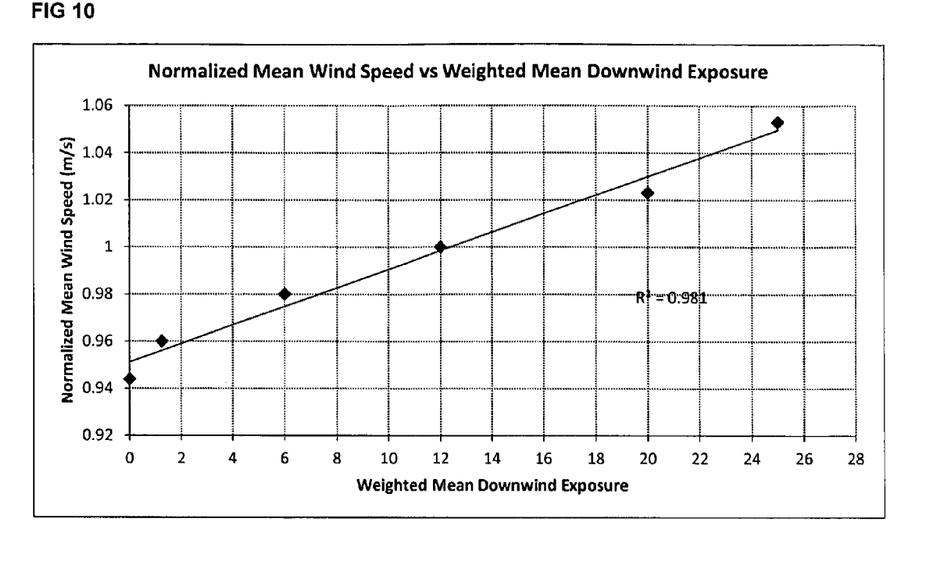
FIG. 10 shows the relationship between normalized mean wind speed and weighted downwind exposure for six different meteorological tower sites.

Once the weighted upwind and downwind bulk exposures have been calculated for each meteorological tower location, the average wind speed at each meteorological tower can be plotted against exposure. FIG. 10 shows a plot of wind speed versus downwind exposure for a hypothetical prospective wind farm location with six meteorological towers. A similar plot can be prepared showing average wind speed versus upwind exposure. It is noted that the wind speeds in FIG. 10 have been normalized, for example by dividing the average wind speed at each meteorological tower by the average wind speed at one of the towers that is considered to be a reference tower. A linear relationship between wind speed and exposure can be developed by fitting a straight line to the points on the scatter plot, as shown in FIG. 10. The line can be fitted by using least squares regression, or any other suitable fitting technique. The quality of the fit to the data points, as expressed by an R^2 value from a least squares regression, or any other suitable statistical measure of quality of fit, can be used to determine the parameter that is most closely correlated to wind speed variation at the prospective wind farm location.

In addition to upwind and downwind exposure values, the average wind speed at each meteorological tower can also be plotted against that tower's elevation. In some cases, this might be more useful than exposure to explain the variation in average wind speed across the project. The choice of upwind exposure, downwind exposure, and elevation as the best parameter to describe wind speed variations can be made by examining the quality of fit of a straight line to the points in the three scatter plots.

In some cases, the variation in average wind speed from one meteorological tower to the next can best be described by using a 2 parameter or a 3 parameter regression. For example, consider a hypothetical prospective wind farm location with five meteorological towers, called Site 1, Site 2, Site 3, Site 4, and Site 5. The seven tables below show measured wind speeds and calculated wind speeds based on one parameter, two parameter, or three parameter regressions with upwind exposure, downwind exposure, and elevation as parameters. For each of the five meteorological towers, the error between measured and calculated wind speeds can be calculated. Then, a total error is calculated as the root mean square (RMS) of each individual error. This gives a parameter to use in comparing various regressions. Other parameters could also be used, including the highest absolute value of error at the meteorological tower with the largest error, or bias in the wind speed calculations. One of ordinary skill in the art would be able to select the best combination of parameters to use in selecting the best model for wind speed. For the example given, the best combination of parameters happens to be the two parameter regression using upwind exposure and elevation. Different results may be obtained at different sites depending on the meteorological and topographic forces that are driving variations in wind speed across the site.

The result of the regression between wind speed and upwind exposure, downwind exposure, and/or elevation is a slope and offset for each parameter selected. Those slopes and offsets can then be applied to the terrain elevation and/or exposure at any given location on the prospective wind farm location, for example at a proposed wind turbine site, in order to calculate the average wind speed at that location.

TABLE 1

One Parameter: Upwind Exposure

| Site | Upwind Exposure | Wind Speed (m/s) | | Error |
| --- | --- | --- | --- | --- |
| | | Measured | Calculated | |
| Site 1 | 23.2 | 9.41 | 9.29 | −1.3% |
| Site 2 | 25.1 | 8.91 | 9.33 | 4.7% |
| Site 3 | 16.8 | 9.21 | 8.75 | −5.0% |
| Site 4 | 33.7 | 9.44 | 9.22 | −2.3% |
| Site 5 | 23.2 | 9.12 | 9.7 | 6.4% |
| | | | RMS Error | 4.4% |

TABLE 2

One Parameter: Downwind Exposure

| Site | Downwind Exposure | Wind Speed (m/s) | | Error |
| --- | --- | --- | --- | --- |
| | | Measured | Calculated | |
| Site 1 | 8.70 | 9.41 | 9.95 | 5.7% |
| Site 2 | 22.10 | 8.91 | 9.23 | 3.6% |
| Site 3 | 35.10 | 9.21 | 9.34 | 1.4% |
| Site 4 | 45.70 | 9.44 | 9.33 | −1.2% |
| Site 5 | −5.50 | 9.12 | 9.71 | 6.5% |
| | | | RMS Error | 4.3% |

TABLE 3

One Parameter: Elevation

| Site | Elevation (m) | Wind Speed (m/s) | | Error |
| --- | --- | --- | --- | --- |
| | | Measured | Calculated | |
| Site 1 | 564 | 9.41 | 9.12 | −3.1% |
| Site 2 | 555 | 8.91 | 8.77 | −1.6% |
| Site 3 | 578 | 9.21 | 9.45 | 2.6% |
| Site 4 | 497 | 9.44 | 10.1 | 7.0% |
| Site 5 | 575 | 9.12 | 9.11 | −0.1% |
| | | | RMS Error | 3.7% |

TABLE 4

Two Parameters: Upwind Exposure and Elevation

| Site | Upwind Exposure | Elevation (m) | Wind Speed (m/s) Measured | Wind Speed (m/s) Calculated | Error |
|---|---|---|---|---|---|
| Site 1 | 23.2 | 564 | 9.41 | 9.47 | 0.6% |
| Site 2 | 25.1 | 555 | 8.91 | 9.21 | 3.4% |
| Site 3 | 16.8 | 578 | 9.21 | 9.12 | −1.0% |
| Site 4 | 33.7 | 497 | 9.44 | 9.25 | −2.0% |
| Site 5 | 23.2 | 575 | 9.12 | 9.22 | 1.1% |
|  |  |  |  | RMS Error | 1.9% |

TABLE 5

Two Parameters: Downwind Exposure and Elevation

| Site | Downwind Exposure | Elevation (m) | Wind Speed (m/s) Measured | Wind Speed (m/s) Calculated | Error |
|---|---|---|---|---|---|
| Site 1 | 8.70 | 564 | 9.41 | 9.5 | 1.0% |
| Site 2 | 22.10 | 555 | 8.91 | 9.3 | 4.4% |
| Site 3 | 35.10 | 578 | 9.21 | 9.21 | 0.0% |
| Site 4 | 45.70 | 497 | 9.44 | 9.55 | 1.2% |
| Site 5 | −5.50 | 575 | 9.12 | 9.01 | −1.2% |
|  |  |  |  | RMS Error | 2.1% |

TABLE 6

Two Parameters: Upwind and Downwind Exposure

| Site | Upwind Exposure | Downwind Exposure | Wind Speed (m/s) Measured | Wind Speed (m/s) Calculated | Error |
|---|---|---|---|---|---|
| Site 1 | 23.2 | 8.70 | 9.41 | 9.44 | 0.3% |
| Site 2 | 25.1 | 22.10 | 8.91 | 9.11 | 2.2% |
| Site 3 | 16.8 | 35.10 | 9.21 | 9.11 | −1.1% |
| Site 4 | 33.7 | 45.70 | 9.44 | 9.56 | 1.3% |
| Site 5 | 23.2 | −5.50 | 9.12 | 9.7 | 6.4% |
|  |  |  |  | RMS Error | 3.1% |

TABLE 7

Three Parameters: Upwind and Downwind Exposure and Elevation

| Site | Upwind Exposure | Downwind Exposure | Elevation (m) | Wind Speed (m/s) Measured | Wind Speed (m/s) Calculated | Error |
|---|---|---|---|---|---|---|
| Site 1 | 23.2 | 8.70 | 564 | 9.41 | 9.445 | 0.4% |
| Site 2 | 25.1 | 22.10 | 555 | 8.91 | 9.13 | 2.5% |
| Site 3 | 16.8 | 35.10 | 578 | 9.21 | 9 | −2.3% |
| Site 4 | 33.7 | 45.70 | 497 | 9.44 | 9.45 | 0.1% |
| Site 5 | 23.2 | −5.50 | 575 | 9.12 | 9.41 | 3.2% |
|  |  |  |  |  | RMS Error | 2.1% |

In practice, there are two parameters that the user of the method of the present invention must select. These include the radius of terrain to be included in calculations of exposure index and the exponent, W, which is the exponent applied for inverse-distance-weighting of the elevation difference between the site and a grid point. These are best selected by trail and error. One of ordinary skill in the art would be able to select the best values of radius and the exponent W by using a variety of values for each parameter and looking for the combination of values that provide the best relationship between wind speed and exposure and/or elevation, thereby presumably resulting in the most accurate predictions of wind speed at each wind turbine location. The selection of radius and exponent W is similar to the selection of a 1 parameter, 2 parameter, or 3 parameter regression in that the goal is to select the model that best describes the wind speed variation across the prospective wind farm site. These selections can be made at the same time that the regression model is being selected, or they can be made independently of the choice of regression.

By applying the model described herein, either the sector-wise model or the bulk model, it is possible to predict the wind speed at any desired location on a prospective wind farm site to relatively high accuracy. At sites that have been modeled to date, it has been possible to calculate wind speeds with a standard error of less than 0.1 m/s. The model is expected to work best at prospective wind farm sites with few or no trees or other surface roughness elements. The sector-wise model is the preferred approach to applying the present invention in cases where wind and direction data are available from two or three meteorological towers. The bulk model is the preferred approach in cases where data is available for four or more meteorological towers.

While embodiments of the invention have been shown and described, it will be apparent to those skilled in the art that various modifications may be made in these embodiments without departing from the scope of the invention. Therefore, the invention is not limited to the particular embodiments described and illustrated herein.

What is claimed is:

1. A method of predicting annual average wind speed at one or more prospective wind turbine site comprising the steps of:
   measuring wind speed and direction at a reference meteorological tower and calculating an annual average wind speed at said reference meteorological tower,
   measuring wind speed at one or more additional meteorological towers and calculating an annual average wind speed at said one or more additional meteorological towers;
   defining the location or locations of said one or more prospective wind turbine site at which annual average wind speed is to be predicted;
   calculating exposure, using a computer, at said reference meteorological tower and at said one or more additional meteorological towers;
   performing a regression of wind speed to exposure between said reference meteorological tower and said one or more additional meteorological towers to calculate a slope and an offset in a linear relationship between wind speed and exposure;
   calculating exposure at said one or more prospective wind turbine site; and
   applying said slope and offset to said exposure at said one or more prospective wind turbine site to predict an annual average wind speed for said one or more prospective wind turbine site.

2. The method of claim 1 wherein said step of calculating exposure at said reference meteorological tower and at said one or more additional meteorological towers and said step of calculating exposure at said one or more prospective wind turbine site comprises calculating upwind exposure.

3. The method of claim 1 wherein said step of calculating exposure at said reference meteorological tower and at said one or more additional meteorological towers and said step of calculating exposure at said one or more prospective wind turbine site comprises calculating downwind exposure.

4. The method of claim 1 wherein said step of calculating exposure at said reference meteorological tower and at said one or more additional meteorological towers and said step of calculating exposure at said one or more prospective wind turbine site comprises calculating both upwind and downwind exposure and wherein said regression of wind speed to exposure is a two parameter regression of wind speed to upwind exposure and wind speed to downwind exposure and wherein said step of applying said slope and offset to said exposure at said one or more prospective wind turbine site comprises applying both slopes and offsets from said two parameter regression.

5. The method of claim 1 further comprising the steps of:
   determining terrain elevation at said reference meteorological tower and at said one or more additional meteorological towers;
   performing a two parameter regression of wind speed to exposure and elevation between said reference meteorological tower and at said one or more additional meteorological towers to calculate a slope and an offset in a linear relationship between wind speed and exposure and a slope and an offset in a linear relationship between wind speed and elevation;
   determining terrain elevation at said one or more prospective wind turbine site; and
   applying said slopes and offsets to said exposure and elevation at said one or more prospective wind turbine site to predict an annual average wind speed for said one or more prospective wind turbine site.

6. The method of claim 5 wherein said step of calculating exposure at said reference meteorological tower and at said one or more additional meteorological towers and said step of calculating exposure at said one or more prospective wind turbine site comprises calculating upwind exposure.

7. The method of claim 5 wherein said step of calculating exposure at said reference meteorological tower and at said one or more additional meteorological towers and said step of calculating exposure at said one or more prospective wind turbine site comprises calculating downwind exposure.

8. A method of predicting annual average wind speed at one or more prospective wind turbine site comprising the steps of:
   measuring wind speed and direction at a reference meteorological tower and calculating an annual average wind speed at said reference meteorological tower;
   measuring wind speed at one or more additional meteorological towers and calculating an annual average wind speed at said one or more additional meteorological towers;
   defining the location or locations of said one or more prospective wind turbine site at which annual average wind speed is to be predicted;
   calculating upwind exposure and downwind exposure, using g computer, at said reference meteorological tower and at said one or more additional meteorological towers;
   determining terrain elevation at said reference meteorological tower and at said one or more additional meteorological towers;
      performing a three parameter regression of wind speed to upwind exposure, downwind exposure, and elevation between said reference meteorological tower and at said one or more additional meteorological towers to calculate slopes and an offsets in a linear relationship between wind speed and upwind exposure, downwind exposure, and elevation;
   calculating upwind exposure and downwind exposure at said one or more prospective wind turbine site;
   determining terrain elevation at said one or more prospective wind turbine site; and
      applying said slopes and offsets to said upwind exposure, downwind exposure, and elevation at said one or more prospective wind turbine site to predict an annual average wind speed for said one or more prospective wind turbine site.

9. A method of predicting annual average wind speed at one or more prospective wind turbine site comprising the steps of:
   measuring wind speed and direction at two or more meteorological towers and calculating an annual average wind speed at each said meteorological tower;
   defining the location or locations of said one or more prospective wind turbine site at which annual average wind speed is to be predicted;
   calculating exposure, using a computer, at said meteorological towers;
   performing a regression of wind speed ratio to difference in exposure between said meteorological towers to calculate a relationship between wind speed and exposure;
   calculating exposure at said one or more prospective wind turbine site; and
      applying said relationship between wind speed and exposure to said exposure at said one or more prospective wind turbine site to predict an annual average wind speed for said one or more prospective wind turbine site.

10. A method of predicting annual average wind speed at one or more prospective wind turbine site comprising the steps of:
   measuring wind speed and direction at two or more meteorological towers;
   defining a plurality of wind direction sectors;
   calculating an average wind speed for each said wind direction sector for each of said two or more meteorological towers;
   calculating a wind speed ratio for each said wind direction sector between said two or more meteorological towers;
   calculating a frequency distribution with the percentage of time that the wind blows from each direction sector for at least one of said meteorological towers;
   defining the location or locations of said one or more prospective wind turbine site at which annual average wind speed is to be predicted;
   calculating exposure, using a computer, at said meteorological towers for each said direction sector;
   performing a regression of wind speed ratio to difference in exposure between said meteorological towers for each said direction sector to calculate a relationship between wind speed and exposure for each said direction sector;
   calculating exposure at said one or more prospective wind turbine site for each said direction sector;
      applying said relationship between wind speed and exposure ,o said exposure for each said direction sector at said one or more prospective wind turbine site to predict a wind speed for each said direction sector for said one or more prospective wind turbine site;
      weighting said wind speed for each direction sector for said one or more prospective wind turbine site by said percentage of time that the wind blows from each direction sector to thereby calculate an annual average wind speed for said one or more prospective wind turbine site.

11. The method of claim 10 wherein said step of calculating exposure at said meteorological towers for each said direction sector and said step of calculating exposure at said one or more prospective wind turbine site for each said direction sector comprises calculating upwind exposure.

12. The method of claim 10 wherein said step of calculating exposure at said meteorological towers for each said direction sector and said step of calculating exposure at said one or more prospective wind turbine site for each said direction sector comprises calculating downwind exposure.

* * * * *